Sept. 10, 1963     E. K. DAVENPORT     3,103,228
PROPORTIONAL FLUID CONTROL APPARATUS
Filed Oct. 29, 1957
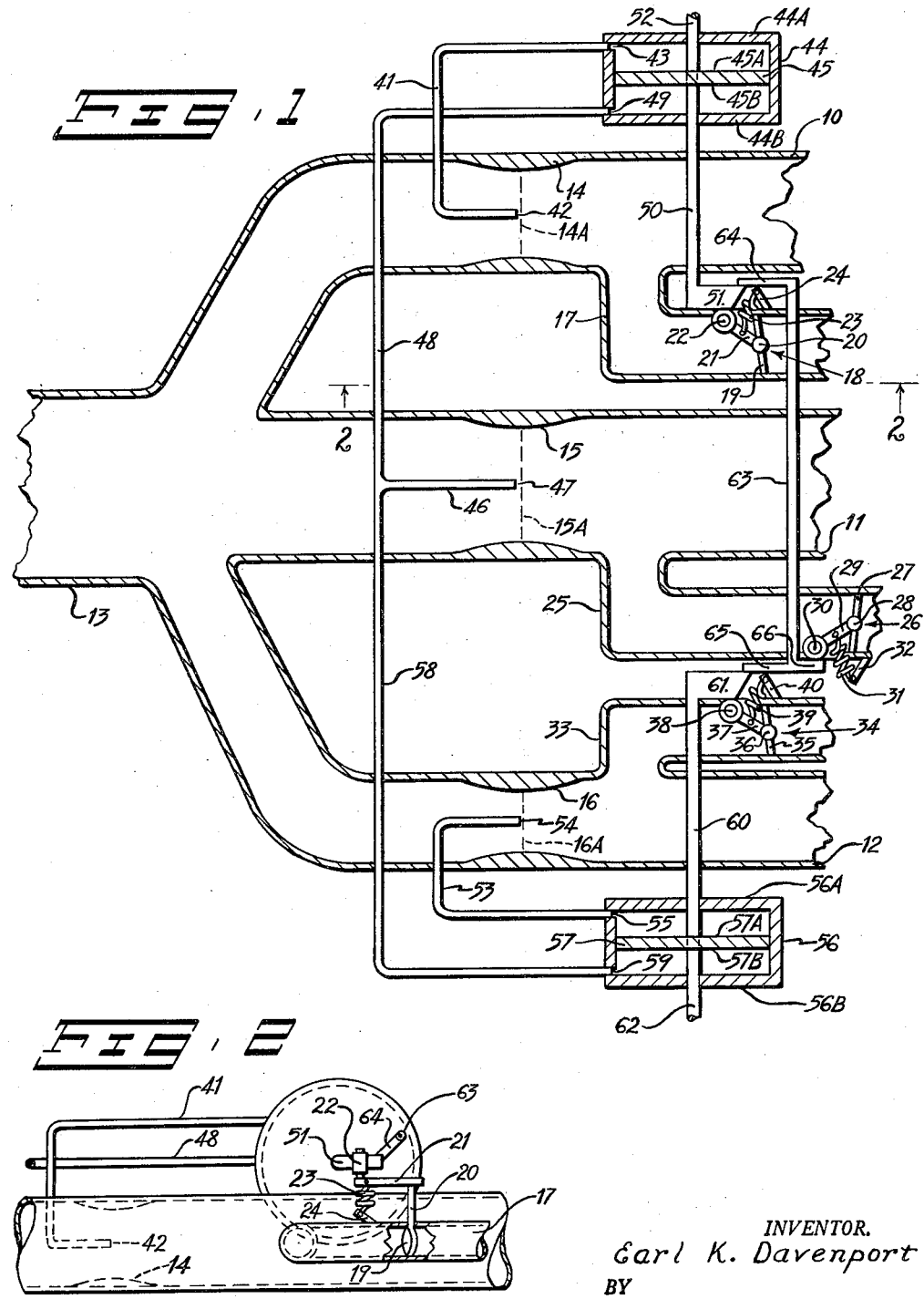
INVENTOR.
*Earl K. Davenport*
BY
*Franz O. Ohlson, Jr.*
ATTORNEY.

United States Patent Office 3,103,228
Patented Sept. 10, 1963

3,103,228
PROPORTIONAL FLUID CONTROL APPARATUS
Earl K. Davenport, Hicksville, N.Y., assignor to Republic Aviation Corporation, Farmingdale, N.Y., a corporation of Delaware
Filed Oct. 29, 1957, Ser. No. 693,056
6 Claims. (Cl. 137—98)

This invention relates in general to fluid control means and more particularly has to do with apparatus for controlling the flow of fluids in a fluid system including a plurality of independent fluid sources.

While the present invention may have general utility, it is particularly adapted for use in the fuel system of an aircraft, where it serves to control the delivery of fuel from a plurality of fuel cells or tanks disposed at various locations in or on the aircraft.

In the operation of aircraft it is often desirable, and in some cases necessary, to empty the fuel cells or tanks either simultaneously or in a particular sequence in order to maintain the aircraft's center of gravity within selected limits. Since the fuel cells are often of different capacities and are disposed at various distances from the aircraft's center of gravity, this frequently requires that a certain percentage or proportion of the total flow of fuel from all the cells be withdrawn or delivered from each cell. Thus, assuming an aircraft is equipped with three fuel cells it may be necessary that the cells deliver 50%, 30% and 20% respectively, of the total fuel requirement of the aircraft power plant or power plants.

In general, the apparatus contemplated herein includes means associated with the outlet or delivery conduit of each fuel cell and responsive to a selected characteristic of the fuel passing therethrough, e.g., its velocity, to actuate means individual to each of the conduits for by-passing any fuel therein in excess of a selected proportion of the total desired flow from all the fuel cells. Thus, by by-passing the quantity of fuel in each delivery conduit that is over and above a preselected quantity, each delivery conduit contributes a selected proportion of the total quantity of fuel delivered by all of the delivery conduits. Stated differently, the instant apparatus controls the fuel supply system in such a manner that the fuel is delivered from each tank in the system in a selected proportion to the entire or total fuel delivery from all the tanks.

Therefore, among other objects the present invention contemplates a fluid control apparatus whereby the delivery or flow of fluids from a plurality of independent fluid sources may be controlled in any selected proportion.

With the above and other objects in view as will become apparent, the present invention consists in the combination and arrangement of parts all as hereinafter more fully described, claimed and illustrated in the accompanying drawing, wherein:

FIG. 1 is a view, partially in section, of the instant invention as applied to proportionally controlling the flow of fluids from their independent sources to a common conduit; and FIG. 2 is an elevational view taken along line 2—2 of FIG. 1.

Referring now to the drawings, 10, 11 and 12 designate, respectively, the outlet conduits of three independent fluid sources, i.e., fuel cells, not shown, which are connected to or joined with a common delivery conduit 13. The fuel is forced through the outlet conduits 10, 11 and 12 under an uncontrolled pressure that is applied to the fuel by any conventional means such as pumps, gravity feed or the pressurization of the fuel cell or tank. For purposes of present illustration, it will be assumed that of the total amount or quantity of fuel delivered to the common conduit 13, it is desired to have 30% delivered by the outlet conduit 10, 50% delivered by the outlet conduit 11 and the remaining 20% by the outlet conduit 12. To accomplish this, the present invention provides the outlet conduit 10 with a venturi 14 having an effective, cross-sectional area 14A, the outlet conduit 11 with a venturi 15 having an effective, cross-sectional area 15A and the outlet conduit 12 with a venturi 16 having an effective, cross-sectional area 16A. The venturis 14, 15 and 16 are so designed that the respective, effective cross-sectional areas are each a percentage of, or proportional to, the total effective, cross-sectional areas of all the venturis to the end that when the velocity of the fuel passing through each venturi is identical, the percentage or proportion of the total fuel flow through each venturi will be the same as the percentage or proportion of the effective, cross-sectional area of each venturi to the total, effective, cross-sectional areas of all the venturis. Thus, in this instance, the effective, cross-sectional area 14A of the venturi 14 equals 30%, the effective, cross-sectional area 15A of the venturi 15 equals 50% and the effective, cross-sectional area 16A of the venturi 16 equals 20% of the sum or total of the effective, cross-sectional areas 14A, 15A and 16A of the venturis 14, 15 and 16, respectively. It follows that when the velocities of the fuel passing through the venturis 14, 15 and 16 are equal, then the fuel flow through these venturis will be 30%, 50% and 20%, respectively, of the total fuel flow through all the venturis, and hence, the outlet conduits 10, 11 and 12, deliver 30%, 50% and 20%, respectively, of the total fuel delivered to the common delivery conduit 13.

In addition to the foregoing, the venturis 14, 15 and 16 are so designed that at the selected, proportional flow of fuel through their respective, effective, cross-sectional areas 14A, 15A and 16A, the total pressure of the fuel at their respective, effective, cross-sectional areas 14A, 15A and 16A is equal. Stated differently, under conditions where 30%, 50% and 20% of the total fuel flow is passing through the venturis 14, 15 and 16, respectively, the total pressure of the fuel in the effective, cross-sectional area 14A of the venturi 14 is equal to that in the effective, cross-sectional area 15A of the venturi 15 and to that in the effective, cross-sectional area 16A of the venturi.

To provide means for controlling the fuel passing through the outlet conduits 10, 11 and 12 and their respective venturis 14, 15 and 16, each conduit has connected thereto, upstream of its venturi, a by-pass conduit including valve means for controlling fuel flow therethrough. Thus, as shown in FIG. 1, the conduit 10 has one end of a by-pass conduit 17 joined thereto upstream of the venturi 14. The opposite end of the by-pass conduit 17, not shown, may communicate with the fuel cell or tank associated with the outlet conduit 10 or with any other container, e.g., an auxiliary fuel system. The flow of fuel through the by-pass conduit 17 is controlled by a butterfly valve assembly 18 comprising a valve disc 19 that is supported by a shaft 20 for rotation within the conduit 17. The shaft 20 is journalled in and passes through the wall of the conduit 17 where suitable sealing means, not shown, are provided to prevent leakage of fuel along the shaft. An actuating arm 21 is fixedly secured at one of its ends to the shaft 20, while the opposite end thereof has mounted thereon a roller 22. A spring 23 attached at one end to a bracket 24 mounted on the by-pass conduit 17 is attached at its other end to the actuating arm 21 between the roller 22 and the shaft 20. The spring 23 imposes a force on the actuating arm 21 that turns the shaft 20 in such a direction that the valve disc 19 is rotated within the conduit 17 so as to be disposed across the same to close communication therethrough. Thus, valve assembly 18 normally occupies a closed position to prevent the flow of fuel through the by-pass conduit 17. The operation of the valve assembly 18 to its open position whereby fuel from the outlet conduit 10 flows through the by-pass conduit 17 will be hereinafter set forth.

In a similar manner, the outlet conduit 11 is provided with a by-pass conduit 25 that communicates at one end with the conduit 11, upstream of the venturi 15, and at its opposite end with the fuel cell, not shown, associated with the delivery conduit 11 or with any other container. Fuel flow through the by-pass conduit 25 is controlled by a butterfly valve assembly 26 similar in construction and operation to the valve assembly 18 of the by-pass conduit 17. Thus, the valve assembly 26 includes a valve disc 27 that is mounted on a shaft 28 for rotation within the by-pass conduit 25. The shaft 28 passes through, and is journalled in, the wall of the by-pass conduit 25 and is fixedly secured at its outer end to one end of an actuating arm 29. The opposite end of the actuating arm 29 is provided with a roller 30. A spring 31 operatively connected between the actuating arm 29 and a bracket 32 mounted on the by-pass conduit 25 imposes a force on the arm 29 such that the shaft 28 rotates the valve disc 27 to dispose it across the by-pass conduit 25 to close communication therethrough.

The outlet conduit 12 is also provided with a bypass conduit 33 that is connected at one end to the conduit 12, upstream of the venturi 16, while its opposite end is connected to the fuel cell, not shown, with which the delivery conduit 12 is associated, or with any other container. A butterfly valve assembly 34 similar in construction and operation to the valve assemblies 18 and 26 controls the flow of fuel from the outlet conduit 12 through the by-pass conduit 33. Thus, the valve assembly 34 includes a valve disc 35 that is secured to a shaft 36 for rotation within the by-pass conduit 33, which shaft 36 is journalled in and passes through the wall of the by-pass conduit 33, and an actuating arm 37 fixedly mounted at one of its ends to the shaft 36 and having a roller 38 at its opposite end. A spring 39 secured at one end to the arm 37 and at its other end to a bracket 40 mounted on the by-pass conduit 33 is effective on the arm 37 to move it in a direction whereby the shaft 36 rotates the valve disc 35 to position it across the by-pass conduit 33 and close it.

The butterfly valve assemblies 18, 26 and 34 are operated in response to the total pressure in each of the venturis 14, 15 and 16 and in such a manner as to provide for the desired or selected flow of fuel therethrough and in their respective outlet conduits 10, 11 and 12 to the common delivery conduit 13.

To these ends, a pressure tube 41 having one end 42 disposed in the venturi 14 communicates at its other end 43 with a closed cylinder 44 whereby the total pressure of the fuel in the venturi 14 is applied to one side 45A of a piston 45 slidably mounted within the cylinder 44. The total pressure in the venturi 15 is delivered to the opposite side 45B of the piston 45 by means of a pressure tube 46 having one end 47 positioned in the venturi 15 and which communicates through one of its branches 48 and the end 49 of said branch with the closed cylinder 44. The piston 45 has fixedly secured thereto a rod 50 that extends normally from the side 45B of the piston 45 and through the adjacent end wall 44B of the cylinder 44. At its outer end, the rod 50 is provided with a lateral extension 51 adapted for engagement with the roller 22 of the actuating arm 21 of the valve assembly 18. The rod 50 and its extension 51 are so dimensioned that when the piston 45 is positioned medially of the cylinder 44 and the valve assembly 18 is in its closed position, the roller 22 of the valve assembly 18 is engaged with the rod extension 51. To equalize the effective areas of the opposed sides 45A and 45B of the piston 45, an idler rod 52 having the same diameter as the rod 50 is secured to the piston 45 to extend outwardly therefrom through the adjacent end wall 44A of the cylinder 44. The length of the idler rod 52 is such as to permit the full reciprocation of the piston 45 within the cylinder 44.

By a similar arrangement, the valve assembly 34 is operated in response to the total pressure of the fuel in the venturis 15 and 16. More particularly, a pressure tube 53 has one of its ends 54 positioned in the venturi 16 and the other end 55 thereof is joined to and communicates with a closed cylinder 56 in such a manner that the total pressure in the venturi 16 is delivered to and is effective upon one side 57A of a piston 57 slidably mounted within the cylinder 56. The total pressure of the fuel in the venturi 15 is applied to the opposite side 57B of the piston 57, through a branch 58 of the pressure tube 46 the end 59 of which opens into the cylinder 56. Thus, the total pressure of the fuel in the venturi 16 is effective on the side 57A of the piston 57 while the total pressure of the fuel in the venturi 15 is applied to and is effective upon the side 57B of the piston 57.

A rod 60 secured at one of its ends to the piston 57 extends normally from the side 57A thereof and through the adjacent end wall 56A of the cylinder 56. At its outer end, the rod 60 is provided with a lateral extension 61 for engagement with the roller 38 carried by the actuating arm 37 of the valve assembly 34. As in the instance of the rod 50, the rod 60 is so constructed and arranged that its lateral extension 61 is in bearing contact with the roller 38 when the valve assembly 34 is in its closed position and the piston 57 is positioned medially of the length of the cylinder 56. The effective areas of the sides 57A and 57B of the piston 57 are equalized or balanced by means of an idler rod 62 that is secured to the side 57B of the piston 57 and which extends through the adjacent end wall 56B of the cylinder 56. The idler rod 62 is of sufficient length to permit the full movement of the piston 57 within the cylinder 56.

The butterfly valve assembly 26 that controls flow of fuel through the by-pass conduit 25 is operatively connected to the rods 50 and 60 of the pistons 45 and 57, respectively. To this end, a link 63 is provided at one end thereof with a finger 64 that is adapted for engagement with the extension 51 of the rod 50. The opposite end of the link 63 is provided with a finger 65 that is engageable with the extension 61 of the rod 60 and a finger 66 that is engageable with the roller 30 carried by the actuating arm 29 of the butterfly valve assembly 26. The foregoing elements are so constructed and arranged that when the valves 18, 26 and 34 are in their closed position to prevent flow through their respective bypass conduits 17, 25 and 33, the finger 64 of the link 63 is engaged with the extension 51, the finger 65 of the link 63 is engaged with the extension 61 of the rod 60 and the finger 66 of the link 63 is engaged with the roller 30 of the actuating arm 29 of the valve 26. Moreover, the extension 51 is in contact with the roller 22 carried by the actuating arm 21 of the valve 18 and the extension 61 is engaged with the roller 38 of the actuating arm 37 of the valve 34.

As hereinbefore set forth, the venturis 14, 15 and 16 in the delivery or outlet conduits 10, 11 and 12, respectively, are so constructed and arranged that when the desired flow of fuel is present in their respective conduits, i.e., when each of the delivery conduits 10, 11 and 12 is delivering its selected proportion of the total flow of fuel to the conduit 13, the total pressure of the fuel in each venturi is equal to that in the others. Thus, the total pressure of the fuel in the venturi 14 equals the total pressure of the fuel in the venturi 15 as well as the total pressure of the fuel in the venturi 16. The total pressure of the fuel in the venturi 15 is delivered through the tube 46 and its branch 48 to the side 45B of the piston 45 and through the tube 46 and its branch 58 to the side 57B of the piston 57, while the total pressure of the fuel in the venturi 14 is delivered through the tube 41 to the side 45A of the piston 45 and the total pressure of the fuel in the venturi 16 is delivered through the tube 53 to the side 57A of the piston 57. It follows from the foregoing, that when the desired flow of fuel is present in the outlet conduits 10, 11 and 12 and through their respective venturis 14, 15 and 16, the pressures on the opposite sides 45A and 45B of the piston 45 and on the opposite sides 57A and 57B of the piston 57, are equal. Should the total pressure of the fuel in either the venturi 14, the venturi 15 or the venturi 16 vary as would be occasioned by a change in the quantity of fuel passing therethrough, the pressures effective on the opposite sides 45A and 45B of the piston 45 and 57A and 57B of the piston 57 become unbalanced with the result that one or more of the valves 18, 26 and 34 are actuated to correct or adjust the fuel flow through one or more of the outlet conduits 10, 11 and 12 to a point where the desired flow is once more attained.

More particularly, if the total pressure of the fuel in the venturi 15 increases for any reason, the increased total pressure of the fuel therein becomes effective against the side 45B of the piston 45 and the side 57B of the piston 57. The resulting unbalancing of the pressures causes the piston 45 to move toward the end wall 44A and the piston 57 to move in the direction of the end wall 56A. This movement of the piston 45 is transmitted through the piston rod 50 and its extension 51 to the finger 64 of the link 63 and through the link 63 and its finger 66 to the roller 30 mounted on the actuating arm 29 of the valve 26. Similarly, the movement of the piston 57 is transmitted through the piston rod 60, extension 61 and fingers 65 and 66 of the link 63 to the roller 30. As a result, the actuating arm 29 is moved against the force exerted thereon by the spring 31 to rotate the disc 27 and open the valve 26, to the end that a portion of the fuel in the main or delivery conduit 11 flows through by-pass conduit 25 and the total pressure of the fuel in the venturi 15 is lowered until it balances with the total pressures of the fuel in the venturis 14 and 16. Under these conditions, the pressures effective on the opposed sides 45A and 45B of the piston 45 and on the opposed sides 57A and 57B of the piston 57 are equal and the system is in balance, i.e., the fuel passing through the venturis 14, 15 and 16, and hence delievered by their respective outlet conduits 10, 11 and 12, is at the selected proportion of the total fluid being delivered to the common delivery conduit 13.

The foregoing operation of the valve 26 in no way causes the operation of either the valve 18, which controls flow through by-pass conduit 17, or the valve 34, which controls flow through by-pass conduit 33. More specifically, as the piston 45 moves toward the end wall 44A the extension 51 on the rod 50 merely disengages from the roller 22 on the actuating arm 21 of the valve 18 and this valve remains in its closed position. In a like manner, the movement of the piston 57 toward the end wall 56A disengages the extension 61 of the rod 60 from the roller 38 on the actuating arm 37 of the valve 34 so that the valve 34 remains in its closed position. Thus, under the foregoing conditions both valves 18 and 34 remain closed and the valve 26 serves to bring the system into balance.

If the total pressure of the fuel in the venturi 15 of the delivery conduit 11 now decreases, the result will be that the pressure effective on the side 45A of the piston 45 will become greater than the pressure on the side 45B thereof. Also, the pressure effective on the side 57A of the piston 57 will exceed that effective on the side 57B thereof. Due to these conditions, the pistons 45 and 57 will be moved toward their respective end walls 44B and 56B. As the piston 45 and its associated rod 50 with its extension 51 and the piston 57 and its associated rod 60 with its extension 61 move as aforesaid, the spring 31 is effective to maintain the fingers 64 and 65 of the link 63 in contact with their associated extensions 51 and 61 of the rods 50 and 60, respectively, as well as to move the actuating arm 29 in a direction whereby the disc 27 of the valve 26 moves toward its closed position in the conduit 25. As a result, the flow of fuel through the conduit 25 is reduced and the total pressure of the fuel in the venturi 15 is increased thereby tending to balance the pressures effective upon the opposed sides 45A and 45B of the piston 45 and the opposed sides 57A and 57B of the piston 57 and to arrest further movement of the pistons 45 and 57. A partial or complete closing of valve 26 as aforesaid may result in balancing the pressures effective on the opposed sides 45A and 45B of the piston 45 and on the opposed sides 57A and 57B of the piston 57. In that event, the movement of the pistons 45 and 57 is stopped as the system attains its balance with the desired proportional flow through each of the venturis 14, 15 and 16.

However, if a partial or complete closing of the valve 26 fails to balance the pressures effective on the pistons 45 and 57, as aforesaid, and hence establish the desired proportional flow of fuel through each of the conduits 10, 11 and 12, the continued unbalanced conditions of these pressures on the pistons 45 and 57 causes them to continue to move toward their respective end walls 44B and 56B. Therefore, as the valve 26 reaches its closed position, the extension 51 of the end of the rod 50 engages the roller 22 of the actuating arm 21 for the valve 18 and the extension 61 of the rod 60 engages the roller 38 carried by the actuating arm 37 of the valve 34. The conitnued movement of the piston 45 toward the end-wall 44B moves the actuating arm 21, against the forces exerted thereon by the spring 23, to rotate the disc 19 and thereby open the valve 18 to permit the flow of fuel from the outlet conduit 10 through the by-pass conduit 17. Similarly, the continued movement of the piston 57 toward the end-wall 56B opens the valve 34 against the bias of spring 39 to permit a portion of the fuel in the outlet conduit 12, to flow through the by-pass conduit 33. In both instances, the total pressure of the fuels in the venturis 14 and 16 is reduced to the end that the pressures effective on the opposed sides of the pistons 45 and 57 are balanced and the entire system is balanced with the selected proportional fuel flow present in each of the outlet conduits 10, 11 and 12.

To further illustrate the operation of the instant apparatus, it is now assumed that the system is in balance, i.e., the desired proportional quantity of fuel is flowing through the venturis 14, 15 and 16, and the valve 18 is closed while valves 26 and 34 are each open to the extent required to attain the balance. Under these conditions, if the flow of fuel through the venturi 14 varies so that the total pressure of the fuel therein increases, this increase of pressure is transmitted through the tube 41 to the side 45A of the piston 45. As a result, the piston 45 moves toward the end-wall 44B thereby operating the valve 18, as aforesaid, to open it and permit a quantity of fuel to flow from the outlet conduit 10, upstream of the venturi 14, through the by-pass conduit 17. This results in a lowering of the total pressure of the fuel in the venturi 14. Concurrently with this operation of the valve 18, the valve 26 is moved to its closed position by the spring 31 thereby stopping the flow of fuel through the by-pass conduit 25, and hence, increasing the total pressure of the fuel in the venturi 15. This change in pressure is transmitted through the tubes 46 and 48 to the side 45B of the piston 45 and tends to balance the pressure effective on the side 45A of this piston. In addition, this increase of the total pressure of the fuel in the venturi 15 is also transmitted through the tubes 46 and 58 to the side 57B of the piston 57 with the result that the piston 57 moves toward the end-wall 56A thereby permitting the spring 39 to move the valve 34 toward its closed position. This results in increasing the total pressure of the fuel in the venturi 16, which increase in pressure is transmitted through the tube 53 to the side 57A of the piston 57 where it becomes effective to balance the pressure on the side 57B of the piston 57. Thus, under the foregoing conditions, the valves 18, 26 and 34 operate in unison to bring the fuel system into balance so that the desired or selected proportional fuel flow through the venturis 14, 15 and 16 is attained.

As above described, an increase in the total pressure of the fuel in the venturi 14 resulted in operating the valve 18 to move it toward its open position and in operating the valves 26 and 34 to move these valves toward their closed position to the end that the fuel system was brought into balance. Under reverse conditions, or where the valve 34 is closed and the valves 26 and 18 are open, should an increase occur in the total pressure of the fuel in the venturi 16, these valves will be operated in substantially the same manner, except that the valve 34 will be operated to move toward its open position while the valve 26 will be moved to its closed position and the valve 18 will be operated to move to its closed position. Here too, the net effect of the simultaneous operation of the valves 18, 26 and 34 is to bring the fuel system into balance so that the selected proportional flow of fuel through the venturis 14, 15 and 16 is attained.

It is also apparent from the foregoing, that when the tube 18 is closed and the valves 26 and 34 are open should the total pressure of the fuel in the venturi 14 decrease, the valve 18 will remain in its closed position and the valves 26 and 34 moved further toward their open position to effect a balancing of the fuel delivered to the common delivery conduit 13. Moreover, in the reverse condition, where valve 34 is closed and valves 18 and 26 are open, in the event the total pressure of the fuel in the venturi 16 decreases, the valve 34 remains in its closed position and the valves 18 and 26 are moved further toward their open position to attain a balanced fuel delivery.

Under conditions where the valves 18, 26 and 34 are each closed and an increase occurs in the total pressure of the fuel in the venturi 14, the increased pressure is transmitted through the tube 41 to the side 45A of the piston 45 to open the valve 18, thereby decreasing the total pressure of the fuel in the venturi 14 until the pressures on both sides of the piston 45 are brought into balance. This will result in balancing the fuel flow through the venturis 14, 15 and 16 to the end that the selected proportional flow therethrough is attained. Similarly, under conditions where the valves 18, 26 and 34 are closed, an increase in the total pressure of the fuel in the venturi 16 will effect an operation only of the valve 34 to obtain a balance of flow through the venturis 14, 15 and 16. Thus, under these conditions the operation of only one valve, i.e., either the valve 18 or the valve 34, is required to attain the selected fuel flow through the venturis 14, 15 and 16 and hence the selected proportional delivery of fuel from their respective outlet conduits 10, 11 and 12 to the common delivery conduit 13.

Having thus described the details of construction, arrangement and operation of the fluid control apparatus contemplated herein it will be apparent to those skilled in the art that the various objects heretofore set forth have been achieved and that various modifications of the instant apparatus may be made without departing from the scope of the instant invention as defined in the following claims. For example, the venturis 14, 15 and 16 are provided to establish an effective, cross-sectional area for their associated outlet conduits 10, 11 and 12, respectively, that will accomplish the selected delivery of fuel. In lieu thereof, the outlet conduits 10, 11 and 12 may be dimensioned to accomplish these ends without departing from the scope of this invention. Moreover, in the foregoing description of the instant invention, it has been assumed that fluids passing through the individual outlet conduits are of the same density. It is understood that should the fluids in these outlet conduits have different densities, then the total pressure of the fluids in their respective venturis at the selected proportional fluid flow would not necessarily be equal or the same. In this event, the effective areas of the pistons controlling the by-pass valves may be adjusted or varied to achieve the desired control of the fluid system.

What is claimed is:

1. In an apparatus for controlling the flow of fluids from a plurality of independent fluid sources each having an outlet conduit associated therewith, the combination of a venturi in each outlet conduit having a throat for establishing a selected effective cross-sectional area therefor, by-pass means individual to each outlet conduit and communicating with its associated conduit upstream of its venturi and operable to by-pass fluid from said outlet conduit, and means responsive solely to the total pressure of the fluid passing through the throat of each of said venturis for respectively controlling the operation of said by-pass means, said means being so arranged that a decrease in the total pressure in any venturi will actuate its associated by-pass to closed position, if open, and upon closure thereof the other by-pass means toward closed position and so that an increase in total pressure in a certain one of said venturis will effect closure of the by-pass in the other of the conduits, if open, and will effect opening of its own by-pass when said others are closed, whereby a selected fluid flow is established and maintained through the throat of each of said venturis.

2. In an apparatus for controlling the flow of fluids from a plurality of independent fluid sources each of which has an outlet conduit associated therewith, the combination comprising a venturi in each outlet conduit for establishing a predetermined effective cross-sectional area for its associated conduit, each of said venturis being constructed and arranged to pass a selected proportion of the total fluid flow through all said venturis when the velocities of the fluids in the venturis are equal, by-pass means individual to and associated with each outlet conduit upstream of its venturi, and means associated with each effective cross-sectional area of each of said venturis and with said by-pass means and responsive solely to the total pressure of the fluid passing through each of said venturis for controlling the flow of fluid through said by-pass means, said means being so arranged with a decrease in the total pressure in any venturi will actuate its associated by-pass to closed position, if open, and upon closure thereof the other by-pass means toward closed position and so that an increase in total pressure of a certain one of said venturis will effect closure of the by-pass in the other of the conduits, if open, and will effect opening of its own by-pass means when said others are closed, whereby the velocity of the fluid passing through each venturi is maintained equal.

3. In an apparatus for controlling the flow of fluids from a plurality of independent fluid sources each of which has an outlet conduit associated therewith, the combination comprising a venturi in each outlet conduit for establishing a predetermined effective cross-sectional area for its associated conduit, the effective cross-sectional areas of said venturis being proportional to each other whereby at a selected velocity of the fluid passing therethrough each venturi passes a selected proportion of the total fluid flow through all said venturis, a by-pass conduit individual to and associated with each outlet conduit upstream of its venturi, valve means associated with each by-pass conduit for controlling the flow of fluid therethrough, and pressure-actuated means associated with and interconnecting each of said valve means, said pressure-actuated means being responsive solely to the total pressure of the fluid passing through each of said venturis to control said valve means to thereby control the flow of fluid through said by-pass conduits, said means being so arranged that a decrease in the total pressure in any venturi will actuate its associated by-pass to closed position, if open, and upon closure thereof the other by-pass means toward closed position and so that an increase in total pressure of a certain one of said venturis will effect closure of the by-pass in the other of the conduits, if open, and will effect opening of its own by-pass means when said others are closed, whereby the velocity of the fluid passing through each venturi is maintained at the selected value.

4. In an apparatus for controlling the flow of fluids from a plurality of independent fluid sources each of which has an outlet conduit associated therewith, the combination comprising a venturi in each outlet conduit having a throat for establishing a predetermined effective cross-sectional area for its associated conduit, the effective cross-sectional areas of the throats of said venturis being proportional to each other whereby at a selected velocity of the fluid passing therethrough the total pressures of the fluids in said venturis are equal and each venturi passes a selected proportion of the total fluid flow through all said venturis, a by-pass conduit individual to and associated with each outlet conduit upstream of its venturi, a valve individual to and associated with each by-pass conduit to control the flow of fluid therethrough, and pressure-actuated means connected to the throat of each of said venturis and to said valves and responsive solely to the total pressure of the fluid passing through the throat of each of said venturis for controlling each of said valves whereby the flow of fluid through said by-pass conduits is regulated to maintain the velocity of the fluid passing through each venturi at the selected value, said pressure-actuated means being so arranged that a decrease in the total pressure in any venturi will actuate its associated by-pass to closed position, if open, and upon closure thereof the other by-pass means toward closed position and so that an increase in total pressure of a certain one of said venturis will effect closure of the by-pass in the other of the conduits, if open, and will effect opening of its own by-pass means when said others are closed.

5. In an apparatus for controlling the flow of fluids from a plurality of independent fluid sources each of which has an outlet conduit associated therewith, the combination comprising a venturi in each outlet conduit for establishing a predetermined effective cross-sectional area for its associated conduit, the effective cross-sectional areas of said venturis being proportional to each other whereby at a selected velocity of the fluid passing therethrough each venturi passes a selected proportion of the total fluid flow through all said venturis and the total pressures of the fluids passing through said venturis are equal to each other, a by-pass conduit individual to and associated with each outlet conduit upstream of its venturi, a valve in each by-pass conduit for controlling the flow of fluid therethrough, a pressure-actuated means connected to the effective cross-sectional area of said venturis and operable in response to the total pressures of the fluids therein, and means operatively connecting each of said valves to said pressure-actuated means, said means being so arranged that a decrease in the total pressure in any venturi will actuate its associated by-pass to closed position, if open, and upon closure thereof the other by-pass means toward closed position and so that an increase in total pressure of a certain one of said venturis will effect closure of the by-pass in the other of the conduits, if open, and will effect opening of its own by-pass means when said others are closed, whereby said valves are operated to control the flow of fluid through said by-pass conduits whereby the velocity of the fluid in each venturi is maintained at the selected value.

6. In an apparatus for controlling the flow of fluids from three independent fluid sources each of which has an outlet conduit individually associated therewith, the combination comprising a venturi in each outlet conduit, each of said venturis being constructed and arranged to pass a selected proportion of the total fluid flow through all said venturis when the velocities of the fluids in all of said venturis are equal, a by-pass conduit individual to and associated with each outlet conduit upstream of its venturi, valve means associated with each by-pass conduit to control the flow of fluid through its associated by-pass conduit, a first pressure-actuated means connected to one of said valves, a second pressure-actuated means connected to another of said valves, means operatively connecting both said first and second pressure-actuated means to the remaining valve, and means communicating said first pressure-actuated means with two of said venturis and said second pressure-actuated means with one of the two venturis communicating with said first pressure-actuated means and the remaining venturi operating said first and second pressure-actuated means in response to the total pressures of the fluids in the venturis associated therewith, said combined means being so arranged that a decrease in the total pressure in any venturi will actuate its associated valve to closed position, if open, and upon closure thereof the other valves toward closed position and so that an increase in the total pressure of a certain one of said venturis will effect closure of the valves in the other of the conduits, if open, and will effect opening of its own valve when said others are closed, whereby said valves are selectively operated to control the flow of fluid through their associated by-pass conduits to maintain the velocities of the fluids passing through said venturis equal.

References Cited in the file of this patent

UNITED STATES PATENTS

| Number | Name | Date |
|---|---|---|
| 1,452,265 | Collins | Apr. 17, 1923 |
| 2,098,574 | Doyle | Nov. 9, 1937 |
| 2,345,522 | Ziebolz | Mar. 28, 1944 |
| 2,345,524 | Ziebolz | Mar. 28, 1944 |
| 2,345,526 | Ziebolz | Mar. 28, 1944 |
| 2,459,000 | Morris | Jan. 11, 1949 |
| 2,626,627 | Jieng et al. | Jan. 27, 1953 |
| 2,692,607 | Savage | Oct. 26, 1954 |
| 2,809,653 | Gold et al. | Oct. 15, 1957 |
| 2,812,715 | Redding et al. | Nov. 12, 1957 |
| 2,817,352 | Barten et al. | Dec. 24, 1957 |
| 2,870,776 | Marsh | Jan. 27, 1959 |
| 2,940,461 | Binford | June 14, 1960 |